United States Patent [19]
Hamilton

[11] Patent Number: 5,485,790
[45] Date of Patent: Jan. 23, 1996

[54] GAS GENERATOR WITH MULTIPLE-CHARGE PRIMER

[75] Inventor: Brian K. Hamilton, Littleton, Colo.

[73] Assignee: Oea, Inc., Denver, Colo.

[21] Appl. No.: 408,113

[22] Filed: Mar. 21, 1995

Related U.S. Application Data

[63] Continuation of Ser. No. 68,889, May 28, 1993, abandoned.

[51] Int. Cl.$^6$ ..................................................... C06D 5/00
[52] U.S. Cl. .......................... 102/531; 102/204; 102/205; 102/275.11; 280/741; 297/480; 422/165
[58] Field of Search ......................................... 102/204, 205, 102/272, 275.11, 530, 531, 702; 280/737, 741, 806; 297/480; 422/164, 165

[56] References Cited

U.S. PATENT DOCUMENTS

| | | | |
|---|---|---|---|
| 573,897 | 12/1896 | Mohr . | |
| 1,163,937 | 12/1915 | Macomber | 102/204 |
| 3,353,488 | 11/1967 | Stadler et al. | 102/205 |
| 3,372,643 | 3/1968 | Kvavle | 102/99 |
| 3,425,351 | 2/1969 | Fyfe | 102/205 |
| 3,529,548 | 9/1970 | Gawlick et al. | 102/45 |
| 3,547,034 | 12/1970 | Popovitch et al. | 102/205 |
| 3,563,178 | 2/1971 | Caples | 102/205 |
| 3,771,454 | 11/1973 | White et al. | 102/45 |
| 3,793,100 | 2/1974 | Fronabargy | 149/77 |
| 3,828,676 | 8/1974 | Junker | 102/39 |
| 3,911,825 | 10/1975 | Gawlick et al. | 102/100 |
| 4,552,380 | 11/1985 | Stevens | 280/728 |
| 4,612,857 | 9/1986 | Schummel | 102/204 |
| 4,711,466 | 12/1987 | Breed | 280/741 |
| 4,734,265 | 3/1988 | Nilsson et al. | 422/165 |
| 4,899,663 | 2/1990 | Thorn | 102/530 |
| 4,941,683 | 7/1990 | Tabata et al. | 280/807 |
| 5,015,311 | 5/1991 | Ramaswamy | 149/42 |
| 5,019,192 | 5/1991 | Ramaswamy | 149/42 |
| 5,043,030 | 8/1991 | Ramaswamy | 149/16 |
| 5,104,145 | 4/1992 | Fohl | 280/734 |
| 5,104,193 | 4/1992 | Fohl | 297/480 |
| 5,131,680 | 7/1992 | Coutas et al. | 280/741 |
| 5,149,128 | 9/1992 | Fohl | 280/734 |
| 5,208,420 | 5/1993 | Hamilton et al. | 102/281 |
| 5,230,531 | 7/1993 | Hamilton et al. | 280/737 |
| 5,279,227 | 1/1994 | Nishizawa | 102/530 |

FOREIGN PATENT DOCUMENTS

| | | | |
|---|---|---|---|
| 87723 | 9/1983 | European Pat. Off. | 102/272 |
| 456853 | 11/1991 | European Pat. Off. | 280/806 |
| 1202103 | 1/1960 | France | 102/205 |
| 2223666 | 4/1990 | United Kingdom | 280/806 |

*Primary Examiner*—Harold J. Tudor
*Attorney, Agent, or Firm*—Sheridan Ross & McIntosh

[57] ABSTRACT

A gas generator for providing gases in which the gas generating propellant is ignited by a multiple charge primer. In one embodiment the primer includes a primer housing which contains a sensitizer and output charge pill which are maintained in spaced relationship. When a firing pin is driven into engagement with the primer, the sensitizer frictionally engages with the output charge pill to cause ignition of at least the output charge pill. This ignition of the output charge pill, directly or indirectly, ignites the propellant to provide gases for a desired function. In this regard, the gas generator is suitable for use in a pretensioner for a seat belt restraint system and in an inflator for expanding an air/safety bag.

22 Claims, 8 Drawing Sheets

GAS GENERATOR WITH MULTIPLE-CHARGE PRIMER

This is a continuation of application Ser. No. 08/068,889, filed on May 28, 1993, now abandoned.

FIELD OF THE INVENTION

The present invention generally relates to the field of gas generators and, more particularly, to a generator which utilizes the frictional engagement between a sensitizer and output charge pill contained within a primer housing to ignite a gas generating propellant.

BACKGROUND OF THE INVENTION

Gas generators are used in a wide variety of applications, one of which is in automotive safety systems. For instance, gas generators are used to provide propellant gases for expanding air/safety bags to protect motor vehicle occupants from an impact of a predetermined magnitude. Gas generators are also used in motor vehicle seat belt restraint systems, particularly in a pretensioner which may be provided for each particular seat belt assembly. Generally, a pretensioner removes slack existing in the associated seat belt assembly upon the sensing of an appropriate condition, such as a predetermined magnitude of deceleration. For example, the propellant gases provided by the gas generator may be used to axially advance a portion of the pretensioner interconnected with the associated seat belt assembly to remove existing slack. Moreover, the propellant gases provided by the gas generator may rotate the associated seat belt retracting device to remove the existing slack.

Gas generators may be electrically or mechanically activated. In electrically-activated gas generators, generally an appropriate sensor sends an electrical signal to the gas generator to initiate combustion of the propellant contained therein. The sensor is typically remotely located such that the signal is sent along one or more lead wires which are interconnected with a squib or other detonating device associated within the gas generator's ignition assembly. In mechanically-activated gas generators, one or more primers (e.g., conventional stab or percussion primers) ignite the propellant after a firing pin engages the primer(s) to ignite the primer composition which then, directly or indirectly, ignites the propellant.

Mechanically-activated gas generators in automotive safety systems provide a number of advantages over those which are electrically initiated. For instance, the sensor(s) of electrically-activated gas generators are typically remotely positioned relative to the gas generator and thus require long lead wires along which the signal(s) must travel. In addition, relatively complex electronic circuitry is typically required, such as to ensure that a signal is sent only for appropriate conditions. Consequently, high material costs and/or reliability issues are often associated with electrically-initiated gas generators.

Mechanically-activated gas generators often incorporate the sensor proximate the gas generator and make such an integral part of the ignition assembly, thereby avoiding problems associated with long lead wires interconnected to squibs in electronic systems. Generally, principles of inertia are utilized to initiate the advancement of a firing pin into engagement with the associated primer, such as based upon a certain deceleration. Notwithstanding the benefits associated with mechanically-activated gas generators, characteristics associated with conventional primer technology presents certain difficulties. For instance, conventional percussion primers typically require significantly high impact energies in order to achieve ignition of conventional primer compositions. As a result, the associated mechanical crash sensor must utilize relatively significant masses to ensure that the required energy transfer occurs. Although conventional stab primers may have reduced impact energy requirements, the more sensitive compositions associated with these primers have actually impeded their use in automotive applications. More particularly, in order to simulate aging, much of the automotive industry requires that all propellants must be able to withstand exposure to a temperature of 107° C. for 400 hours and yet still properly ignite thereafter. Some stab primer compositions are unable to meet this standard.

Based upon the foregoing, it would be desirable to take advantage of the benefits offered by mechanically-activated gas generators. However, it would be desirable to have reduced primer energy input requirements and yet still meet current automotive industry standards.

SUMMARY OF THE INVENTION

The present invention relates to a mechanically-activated gas generator for providing propellant gases, such as for expanding an air/safety bag in an automotive inflatable safety system and/or for providing the required retractive forces in a pretensioner in an automotive seat belt restraint system. Generally, the gas generator of the present invention has at least one gas generator outlet and contains a gas-generating propellant. A primer having two separate charges therein is interconnected with the gas generator housing and a firing pin or other impacting mass is aligned with the primer. Activation of the firing pin drives it into engagement with the primer to frictionally engage the first and second charges and ignite at least the second charge, although both charges may simultaneously ignite. Nonetheless, ignition of the second charge ignites, directly or indirectly, the propellant and the resulting propellant gases flow out of the gas generator outlet(s) to provide the desired function.

In one embodiment, one of the primer charges is a sensitizer (e.g., sulfur, red phosphorous) which is attached to the end of the primer housing which projects toward the firing pin on an interior surface thereof, while the other is an output charge (e.g., a stable high energy mixture such as a mixture of potassium chlorate and potassium ferricyanide) in the form of a pill which is pressed within the primer housing and projects toward the propellant. Although the output charge pill may be used to directly ignite the propellant, the primer housing may also contain a third charge, such as an output charge in powdered form. In this case the output charge pill ignites the output charge powder, which then ignites the propellant. Instead of pressing an output charge into the primer housing, the output charge pill may be in the form of a slurry which is injected into the primer housing. When the output charge hardens into a pill it nonetheless has sufficient density to still be ignited by the frictional engagement with the sensitizer, while having enhanced burn characteristics due to its porosity. In this case, the primer housing may be modified to provide a cavity for the output charge which is necked in at its two ends to retain the output charge in the main body portion of the cavity even after shrinkage of the slurry while drying to form the output charge.

By using a multiple-charge configuration for the primer and the frictional engagement between the sensitizer and output charge pill to ignite at least the output charge pill, the input energy requirements may be significantly reduced (e.g., less than 0.5 inch-ounce, and even less than 0.25 inch-ounce). A number of parameters associated with the primer affect its sensitivity, and thus the input energy requirements. These include the amount of spacing between the sensitizer and output charge, the density of the output charge pill, the configuration of the firing pin, characteristics of the primer end which interfaces with the firing pin (e.g., material selection and/or thickness to vary the amount of force required for the necessary deflection/deformation to frictionally engage the sensitizer and output charge pill). For instance, the firing pin may utilize a frustumly-shaped configuration to define a blunt-nosed end of relatively small diameter such that the frictional engagement of the sensitizer and output charge pill occurs over a relatively small area, thereby reducing input energy requirements. Moreover, the density of the output charge may be relatively high (e.g., 95%–97% of theoretical density, namely that density which is calculated from the perfect crystal density of each of the various constituents) to reduce input energy requirements. However, when such a high density output charge is utilized, it may be necessary to incorporate the above-described third charge in the primer to ignite the propellant.

BRIEF DESCRIPTION OF THE DRAWINGS

FIG. 3A is an enlarged view of a portion of the ignition assembly for the inflator of FIG. 3;

DETAILED DESCRIPTION

The present invention will be described with reference to the accompanying drawings which assist in illustrating the pertinent features thereof. Generally, the present invention is a gas generator which utilizes at least one primer having multiple charges (e.g., a sensitizer and at least one output charge) therein to affect ignition of a gas generating propellant. More particularly, a sensitizer and output charge pill are frictionally engaged by a firing pin or other appropriate impacting mass which ignites at least the output charge pill, which then in turn ignites/causes the ignition of the propellant to provide a flow of propellant gases for the desired function.

The gas generator of the present invention may be used in a variety of applications, including in automotive safety systems. One such system is a pretensioner for a seat belt restraint system. Generally, pretensioners are used to provide retractive forces for removing slack existing in the seat belt restraint system upon the sensing of an appropriate condition. U.S. Pat. Nos. 4,734,265; 4,941,683; 5,104,145; 5,104,193; and 5,149,128 each disclose various types of and/or relate to pretensioners for seat belt restraint systems, and the entire disclosure of such references is hereby incorporated by reference.

Figure 1:
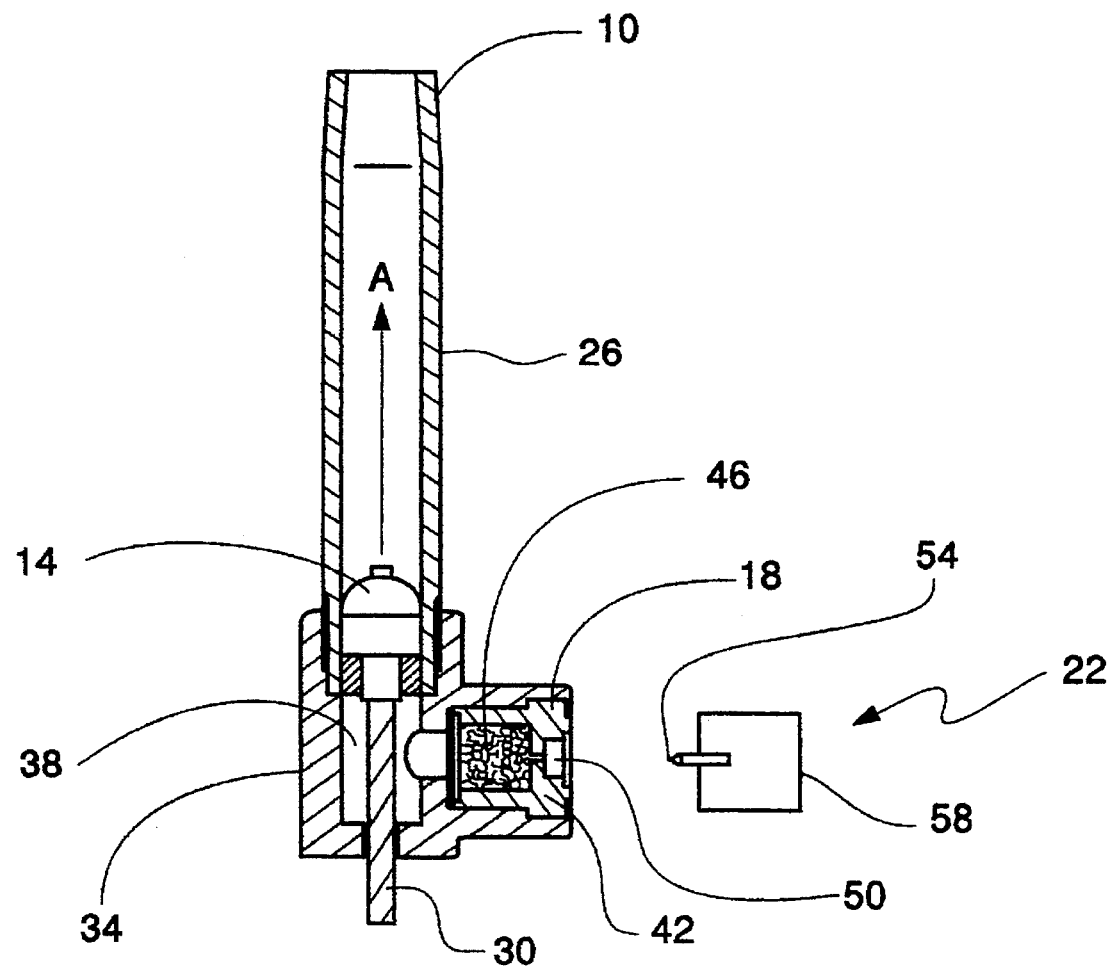
FIG. 1 is a cross-sectional view of one embodiment of a pretensioner which may incorporate a gas generator in accordance with the principles of the present invention.

The general principles of pretensioning an automotive seat belt restraint system are illustrated in FIG. 1 as provided by a pretensioner 10 which may incorporate a gas generator of the present invention. The pretensioner 10 generally includes a piston 14 which is appropriately interconnected with the seat belt restraint system (not shown), a gas generator 18 for advancing the piston 14 in the direction of the arrow A to transmit the necessary retractive forces to the seat belt restraint system to remove any existing slack therein, and a sensor/firing pin assembly 22 for sensing a condition in which activation of the pretensioner 10 would be desirable and thereafter transmitting an appropriate signal to the gas generator 18. More particularly, the piston 14 is slidably received within a cylinder 26, positioned near an end thereof, and interconnected with the seat belt restraint system (not shown) by an appropriate connector 30. The end of the cylinder 26 in which the piston 14 is located is received within a pretensioner housing 34. The pretensioner housing 34 includes a gas chamber 38 positioned adjacent the piston 14 and it also receives the gas generator 18 which interfaces with the gas chamber 38.

The gas generator 18 includes an appropriately configured gas generator housing 42, a propellant 46 for generating the desired gases, and a primer 50 (only generally illustrated) for igniting the propellant 46. The firing pin 54 of the sensor/firing pin assembly 22 is aligned with the primer 50 and is interconnected with an appropriate sensor 58 (e.g., inertial). When the sensor 58 detects an appropriate condition, such as a predetermined deceleration, this initiates movement of the firing pin 54 into engagement with the primer 50 which causes ignition of the propellant 46 (the manner in which will be discussed in more detail below). The propellant gases generated thereby flow into the gas chamber 38 and force the piston 14 in the direction of the arrow A to apply the necessary retractive forces to the seat belt restraint system, particularly to remove any existing slack in the system.

Figure 2:
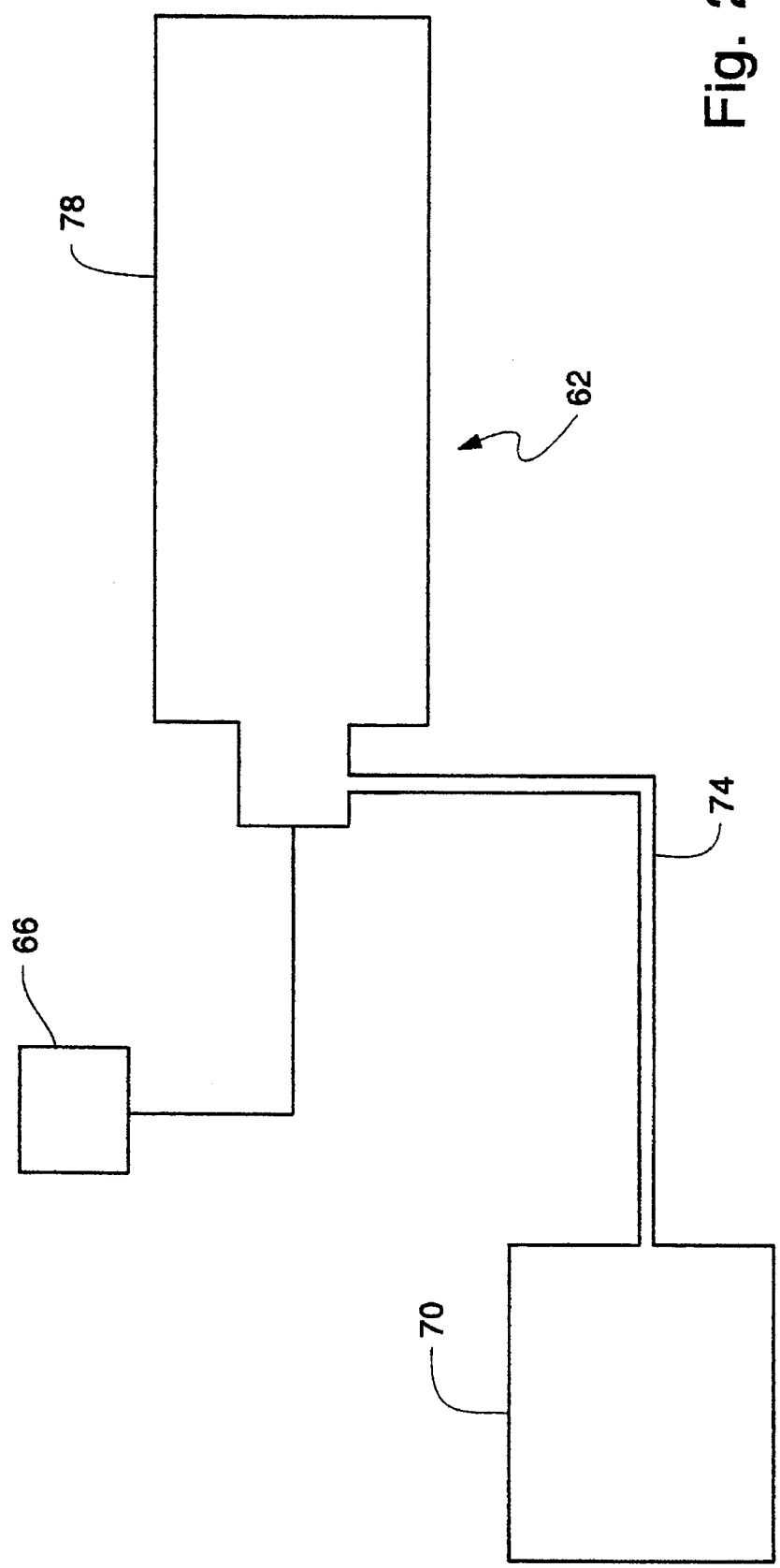
FIG. 2 is a general schematic representation of an automotive inflatable safety system.

Another automotive safety system which may utilize a gas generator of the present invention is an inflatable safety system in which a gas generator provides at least a portion of the gases which expand the air/safety bag. One such system is schematically illustrated in FIG. 2. The inflatable safety system 62 generally includes an appropriate sensor 66

(impact, deceleration), an expandable air/safety bag 70, and an inflator 78 which receives an appropriate signal from the sensor 66 of a condition requiring activation of the system 62. When this signal is received, the inflator 78 provides an appropriate gas through the conduit 74 to expand the air/safety bag 70.

Figure 3:
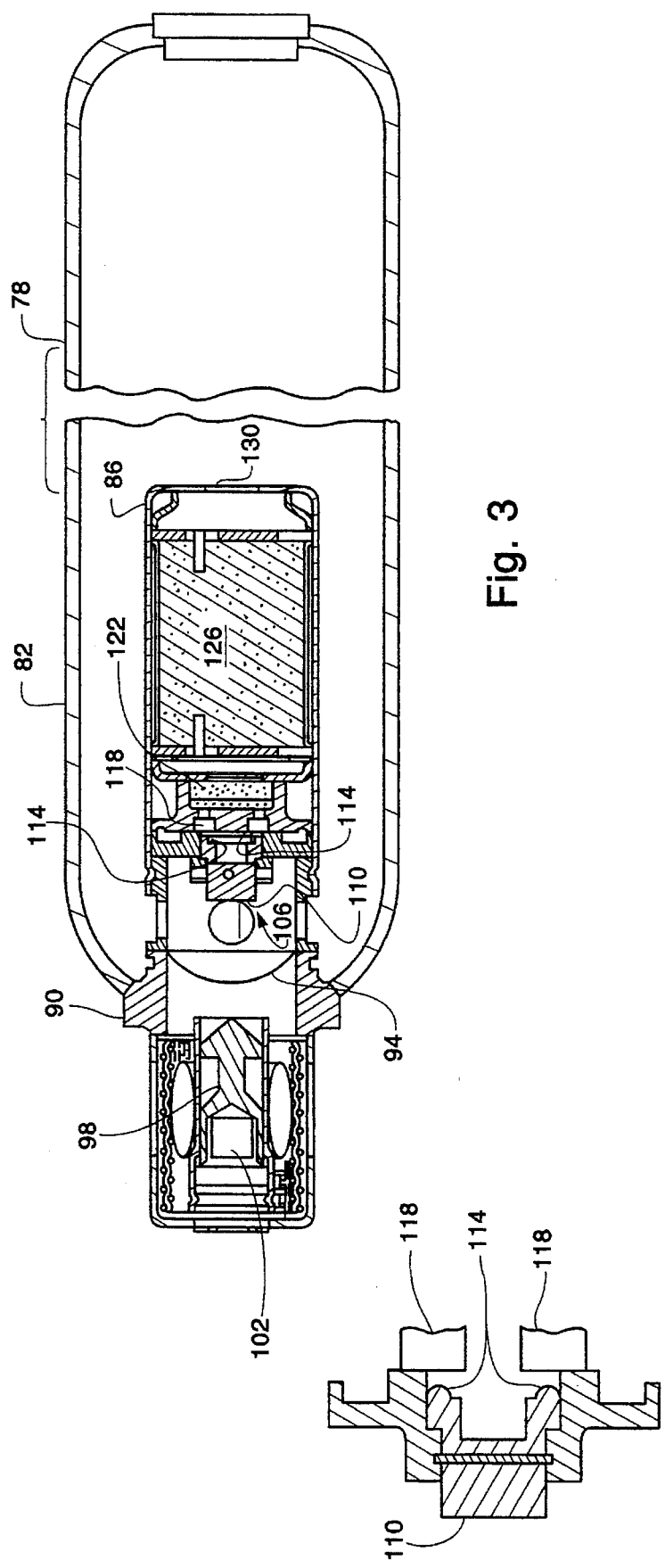
FIG. 3 is a longitudinal cross-sectional view of one embodiment of an inflator for use in the automotive inflatable safety system of FIG. 2 and which may incorporate a gas generator in accordance with the principles of the present invention.

The inflator 78 is more particularly illustrated in FIGS. 3 and 3A and such may incorporate a gas generator utilizing the principles of the present invention. The inflator 78 is described in more detail in U.S. patent application Ser. No. 07/817,455, filed Jan. 6, 1992, the entire disclosure of which is incorporated by reference herein. The inflator 78 is generally referred to in the art as a hybrid in that it provides both a stored gas (ambient temperature) and propellant gas (elevated temperature) to the air/safety bag 70. In this regard, the inflator 78 generally includes a pressure bottle 82 (stored gas source) and a gas generator 86 (propellant gas source) which is positioned inside the pressure bottle 82 and which is interconnected therewith generally by a manifold assembly 90.

The pressure bottle 82 contains an appropriate stored gas under pressure which is retained therein by a closure disc 94 positioned within the manifold assembly 90. In order to rupture the closure disc 94, a projectile 98 is positioned within the manifold assembly 90 on the side of the closure disc 94 opposite the stored gases and appropriately interconnected with a squib 102. Upon receipt of an appropriate signal from the sensor 66 (FIG. 2), the squib 102 ignites to propel the projectile 98 through the closure disc 94 to release the stored gas which flows through and then out of the manifold assembly 90 and into the air/safety bag 70 (FIG. 2).

The projectile 98 provides a dual function in that after it ruptures the closure disc 94, it also activates the gas generator 86 by impacting its ignition assembly 106. In this regard, the gas generator 86 is appropriately secured to an end of manifold assembly 90 and its ignition assembly 106 is substantially aligned with the path of the projectile 98. The ignition assembly 106 generally includes a slidable piston 110 having a firing pin assembly 114 (e.g., a ring or a plurality of individual pins or other impacting masses) on an end thereof which is aligned with a plurality of primers 118 (only generally illustrated and which are discussed in more detail below). A booster charge 122 is positioned between the primers 118 and the gas generating propellant 126. Consequently, the projectile 98 impacts the piston 110 to drive it, namely the firing pin assembly 114, into engagement with the primers 118. As a result of this impact, the primers 118 are ignited (the manner in which will be discussed in more detail below), which ignites the booster charge 122, and which thereby ignites the propellant 126. The propellant gases are discharged through the gas generator outlet 130 such that the gases may flow to the air/safety bag 70 in the above-described manner.

Figure 4:
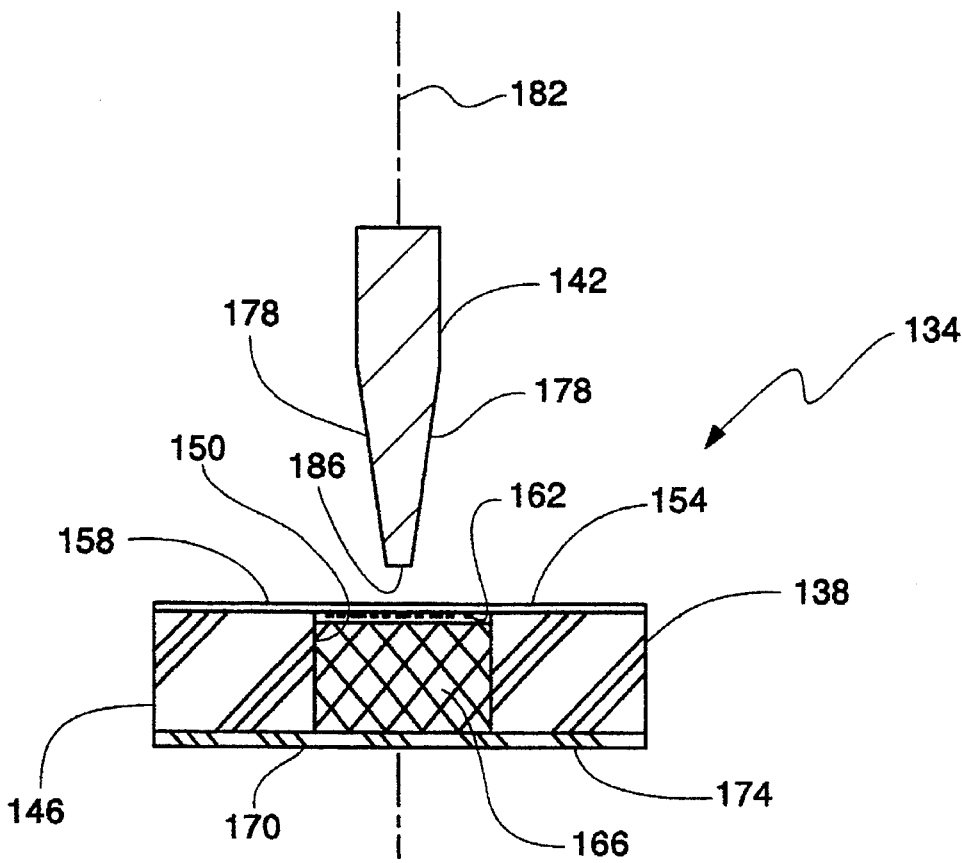
FIG. 4 is a cross-sectional view of a first embodiment of an ignition assembly for a gas generator of the present invention.
Figure 4A:
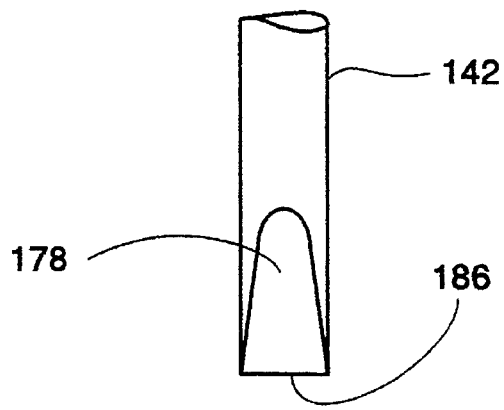
FIGS. 4A–B are side and bottom views, respectively, of the firing pin from the ignition assembly of FIG. 4.
Figure 4B:
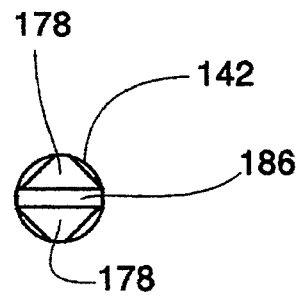

Each of the above-described gas generators used by the pretensioner 10 and inflator 78 may incorporate the principles of the present invention. A more detailed illustration of an ignition assembly for use with a gas generator in accordance with the principles of the present invention is illustrated in FIGS. 4 and 4A–B. The ignition assembly 134 generally includes a primer 138 and firing pin 142. Initially, the primer 138 includes a primer housing 146 which is typically formed from an appropriate material (e.g., aluminum, brass, steel, etc.) which allows for an appropriate interface with a gas generator housing (e.g., the housing 146 is substantially rigid). The primer housing 146 has a substantially cylindrical bore 150 which extends entirely through the central region thereof for receiving the multiple primer charges. In one embodiment, the bore 150 has a diameter ranging from about 0.080" to about 0.125" and a length ranging from about 0.080" to about 0.200".

One end of the bore 150, namely the impact end 154 of the primer 138 which projects toward the firing pin 142, is closed by a sealing foil 158. In one embodiment, the sealing foil 158 is formed from plastic-like materials such as a silver metallized polyester tape available from Minnesota Mining & Manufacturing Company (Product No. 852). A sensitizer 162 (one of the primer charges) is adhered to the interior side of the sealing foil 158 by use of the adhesive material on the tape. Alternatively, the sensitizer 162 may be fixed or impregnated onto a sheet of material (e.g., paper) which then in turn may be adhered to the interior of the sealing foil 158. Moreover, it may be possible to place the sensitizer 162 directly on the firing pin 142 discussed below.

An output charge pill 166 (e.g., pressed from an appropriate powder mixture and another of the primer charges) is pressed into the bore 150, typically in spaced relationship with the sensitizer 162. In one embodiment, this spacing ranges from about 0.005" to about 0.020". A closure disc 170 seals the other end of the bore 150, namely the discharge end 174 of the primer 138 which projects toward the gas generating propellant. In one embodiment, the closure disc 170 is formed from materials such as the above-described silver metallized polyester tape. Under certain circumstances, it may be desirable to incorporate score lines (not shown) on the closure disc 170 to assist in the rupturing of the disc 170 upon ignition of the output charge pill 166. Moreover, it may be possible for the disc 170 to include a hole (not shown) for directly discharging combustion products from the bore 150.

The firing pin 142 is interconnected/incorporated with an appropriate driving source/force (e.g., the sensor 58 of FIG. 1, on the piston 110 of FIGS. 3 and 3A) such that it may impact the primer 138 at the appropriate time. The firing pin 142 is chisel-shaped in that it has two opposing, substantially planar surfaces 178 which taper inwardly toward its central axis 182. The impacting end 186 of the firing pin 142 is thus substantially rectangular. In embodiment, the impacting end 186 may have a width ranging from about 0.005" to about 0.010" a length ranging from about 0.050" to about 0.125" and a surface area ranging from about 0.00025 in.$^2$ to about 0.00125 in.$^2$.

When an appropriate driving force advances the firing pin 142 toward the primer 138, the firing pin 142 deflects, but preferably does not at least initially pierce, the sealing foil 158 to frictionally engage the sensitizer 162 and output charge pill 166. The frictional engagement of the sensitizer 162 and output charge pill 166 cause the simultaneous ignition thereof, or at least the ignition of the output charge pill 166. Upon ignition of the output charge pill 166, the pressures generated thereby rupture the closure disc 170 and the heat generated by the ignition of the output charge pill 166 ignites the gas generating propellant. As noted, the use of a scored closure disc 170 may allow for enhanced rupturing of the disc 170. Although it is preferable for the sealing foil 158 to not be pierced by engagement of the firing pin 142, after ignition of the output charge pill 166, the sealing foil 158 may also rupture. Consequently, this may render the ignition assembly 134 inappropriate for certain applications and/or may require appropriate seals to ensure that a sufficient amount of the heat from combustion of the output charge pill 166 is directed toward the propellant by the bore 150.

The combustion of the output charge pill 166 is used to provide for the ignition of the gas generating propellant which is typically positioned substantially adjacent thereto. However, appropriate booster charges may actually be positioned between the output charge pill 166 and the gas generating propellant as noted above with regard to the inflator 78. Nonetheless, the actual composition of the output charge pill 166 must be selected such that it is ignitable by frictional engagement with the sensitizer 162 in order to achieve the benefits provided by the present invention. In this regard, various sensitive mixtures of several high energy pyrotechnic compositions may be utilized for the output charge pill 166 (e.g., compositions which include chlorates and/or permanganates). In one embodiment, the output charge pill 166 is a composition of 60% (by weight) potassium chlorate ($KClO_3$) mixed with 40% (by weight) potassium ferricyanide ($K_3Fe(CN)_6$).

The sensitizer 162 is used to ignite the output charge pill 166 by frictional engagement therewith. Since the primer 138 is typically used with mechanically-activatable gas generators, it is desirable for the interaction of the sensitizer 162 and output charge pill 166 to be relatively significantly friction sensitive when engaged to reduce the input energy requirements. Consequently, in one embodiment the sensitizer 162 utilizes red phosphorous. However, other sensitizers such as sulfur may be used. Although a combined friction sensitivity is required, the output charge pill 166 by itself need not be friction sensitive. This enhances various safety aspects in manufacturing such charge pills 166 which are typically formed by the compression of an appropriate powder.

Based upon the foregoing, it is apparent that the principles of the primer 138 differ from a standard percussion primer. A conventional percussion primer generally includes a primary explosive which itself detonates or ignites when impacted by a firing pin. More particularly, the initial reaction which results in the ignition of the primer composition occurs within the primer itself. In contrast, the frictional interaction between the sensitizer 162 and output charge pill 166 effectively results in the simultaneous ignition thereof. More particularly, the initiating reaction occurs at the interface between the sensitizer 162 and the output charge pill 166 as a result of the frictional engagement therebetween. Consequently, ignition of the primer 138 is due to the interaction between the two pyrotechnic materials.

Figure 5:
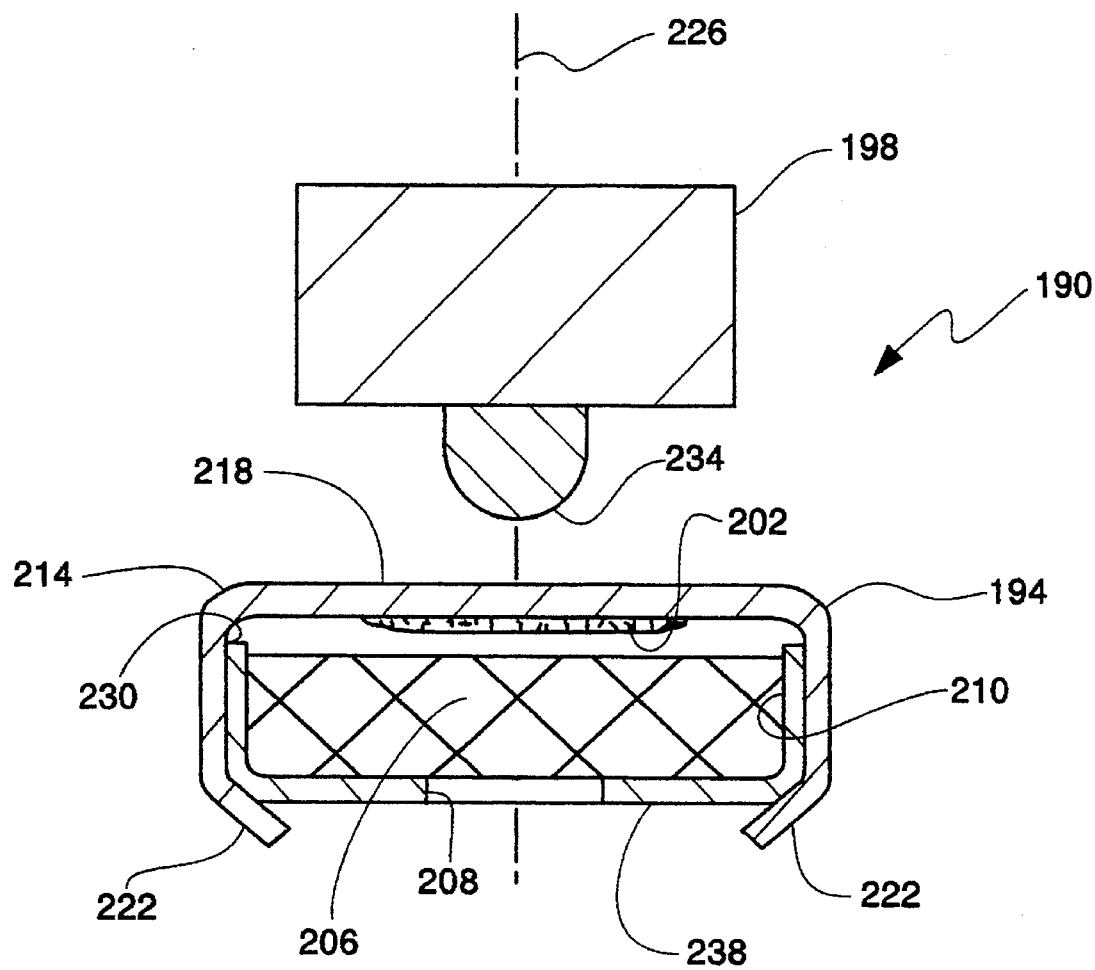
FIG. 5 is a cross-sectional view of a second embodiment of an ignition assembly for use in a gas generator of the present invention.
Figure 5A:
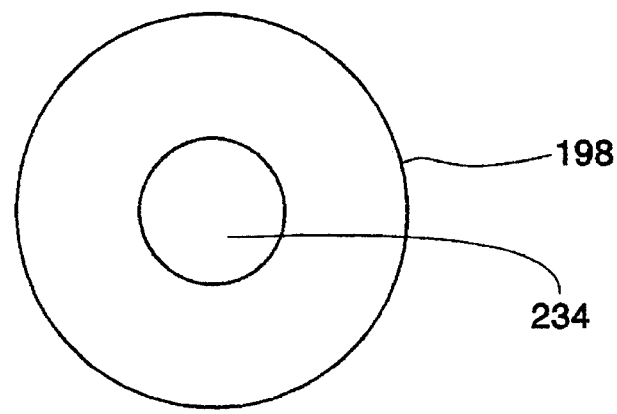
FIG. 5A is a bottom view of the firing pin from the ignition assembly of FIG. 5.

Another embodiment of an ignition assembly which may be used in conjunction with a gas generator in accordance with the principles of the present invention is illustrated in FIGS. 5 and 5A. Generally, the ignition assembly 190 includes a primer 194 and firing pin 198. The primer 194 incorporates a sensitizer 202 and output charge pill 206 which are similar to the sensitizer 162 and output charge pill 166 discussed above. Consequently, the sensitizer 202 frictionally engages the output charge pill 206 due to the impacting of the firing pin 198 on the primer 194. This frictional engagement typically simultaneously ignites both the sensitizer 202 and output charge pill 206, which may then affect ignition of an appropriate gas generating propellant.

The primer 194 generally includes a metal charge cup 210 which is positioned interiorly of a metal shell 214. The sensitizer 202 is appropriately adhered to the interior of the impact end 218 (which projects toward the firing pin 198) of the metal shell 214 by appropriate adhesives and/or binders (e.g., acrylic adhesives, nitrocellulose lacquers, animal glue). The charge cup 210 retains the output charge pill 206 and is itself retained within the metal shell 214 by end portions 222 which are crimped to taper inwardly toward the central axis 226 of the primer 194. The sidewalls 230 of the charge cup 210 may extend beyond the output charge pill 206 to maintain a spaced relationship between the sensitizer 202 and the output charge pill 206 if desired/required. In one embodiment, this spacing may range from about 0.002" to about 0.020".

The firing pin 198 has a rounded/spherical impacting end 234 for engaging the primer 194. In one embodiment, the impacting end 234 has a radius ranging from about 0.020" to about 0.050". When an appropriate driving force advances the firing pin 198 toward the primer 194, the firing pin 198 engages the impact end 218 of the metal shell 214 and deforms the metal shell 214 to frictionally engage the sensitizer 202 and output charge pill 206. Since this deformation is required, in one embodiment the impact end 218, and typically the entire the metal shell 214, is formed from deformable metals such as brass, nickel, aluminum, or steel, and has a thickness generally ranging from about 0.010" to about 0.03".

The frictional engagement of the sensitizer 202 and output charge pill 206 causes the simultaneous ignition thereof, or at least the ignition of the output charge pill 206. Upon ignition of the output charge pill 206, the pressures generated ruptures the charge cup 210 and the heat generated by the ignition of the output charge pill 206 thereafter, directly or indirectly, ignites the gas generating propellant. As noted above, it may be desirable to incorporate score lines (not shown) on the discharge end 238 of the charge cup 210 to assist in the rupturing thereof. Moreover, a hole 208 may be positioned on the discharge end 238 of the charge cup 210

Figure 6:
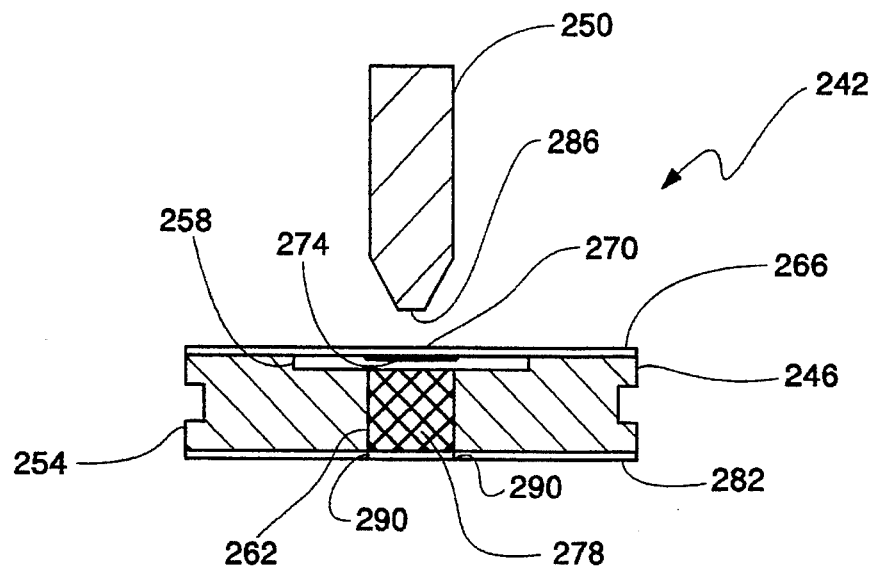
FIG. 6 is a cross-sectional view of a third embodiment of an ignition assembly for use in a gas generator of the present invention.
Figure 6A:
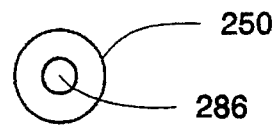
FIG. 6A is a bottom view of the firing pin from the ignition assembly of FIG. 6.

Another embodiment of an ignition assembly for use with a gas generator in accordance with the principles of the present invention is illustrated in FIGS. 6 and 6A. The ignition assembly 242 generally includes a primer 246 and firing pin 250. The primer 246 incorporates a sensitizer 274 and output charge pill 278 which are similar to the sensitizer 202 and output charge pill 206 discussed above. Consequently, the sensitizer 274 frictionally engages the output charge pill 278 due to the impacting of the firing pin 250 on the primer 246. This frictional engagement typically simultaneously ignites both the sensitizer 274 and output charge pill 278, which may then affect ignition of an appropriate gas generating propellant.

The primer 246 generally includes a metal primer housing 254 (e.g., formed from materials similar to those identified with regard to housing 146 discussed above) having first and second bores 258, 262 which collectively extend therethrough. The first bore 258 is positioned on one end of the primer 246 and has a diameter which will typically range from about 0.150" to about 0.300" and a length ranging from about 0.002" to about 0.020". An input disc 266 closes one end of the first bore 258 and defines the impact end 270 of the primer 246 which projects toward the firing pin 250. In one embodiment the input disc 266 is formed from materials such as the above-described silver metallized polyester tape and has a thickness of about 0.002". A sensitizer 274 is typically embedded and/or attached to the interior side of the input disc 266, such as by utilizing appropriate adhesives and/or binders, such as the adhesive on the above-described tape. The material/thickness selection of the input disc 266 and/or the size (diameter) of the first bore 258 allows for a proper deflection of the input disc 266 for frictional engagement of the sensitizer 274 with the output charge pill 278.

The second bore 262 contains the output charge pill 278 which is pressed therein, typically in spaced relation to the sensitizer 274. In one embodiment, the spacing between the sensitizer 274 and output charge pill 278 ranges from about 0.002" to about 0.020". Moreover, the diameter of the second bore 262 ranges from about 0.075" to about 0.125", and its length ranges from about 0.075" to about 0.188". An output disc 282 closes the end of the second bore 262 which projects toward the gas generating propellant and thus retains the output charge pill 278 within the second bore 262. In one embodiment the output disc 282 is formed from materials such as the above-described tape or aluminum foil and has a thickness ranging from about 0.002" to about 0.006". As noted above, in certain applications it may be desirable to incorporate appropriate score lines 290 (or a hole not shown) to assist in the rupturing of the output disc 282.

The firing pin 250 is appropriately interconnected with an appropriate driving/propelling source (not shown) such that it may impact the primer 246 at the appropriate time. Moreover, the firing pin 250 has a frustumly-shaped configuration in that it tapers to a substantially circular impacting end 286 having a diameter typically ranging from about 0.002" to about 0.020", and typically about 0.005 inch. Consequently, the ratio of the area of the impacting end 286 of the firing pin 250 to the area of the surface of the output charge pill 278 which projects toward the firing pin 250 ranges from about 0.07% to about 2.56%. However the firing pin 250 may actually taper to a point if certain concessions/accommodations are made. Nonetheless, this causes intensive frictional engagement of the sensitizer 274 and output charge pill 278 over a relatively small area and thus reduces input energy requirements. In this case, the input energy requirements for the primer 246 can be less than 0.5 inch ounce, and even as low as 0.25 inch ounce or less if desired utilizing the noted configuration for the firing pin 250.

When an appropriate driving force advances the firing pin 250 toward the primer 246, the firing pin 250 deflects, but preferably does not at least initially pierce, the input disc 266 to frictionally engage the sensitizer 274 and output charge pill 278. The frictional engagement of the sensitizer 274 and output charge pill 278 cause the simultaneous ignition thereof, or at least the ignition of the output charge pill 278. Upon ignition of the output charge pill 278, the pressures generated thereby rupture the output disk 282 and the heat generated by the ignition of the output charge pill 278 ignites, directly or indirectly, the gas generating propellant. Depending upon the thickness and/or material selection for the input disc 266, the disc 266 may or may not rupture after ignition of the output charge pill 278. Therefore, if a given application requires a "seal", either the thickness and/or material of the input disc 266 may be selected so as to not rupture or additional sealing devices may be incorporated (not shown).

Figure 7:
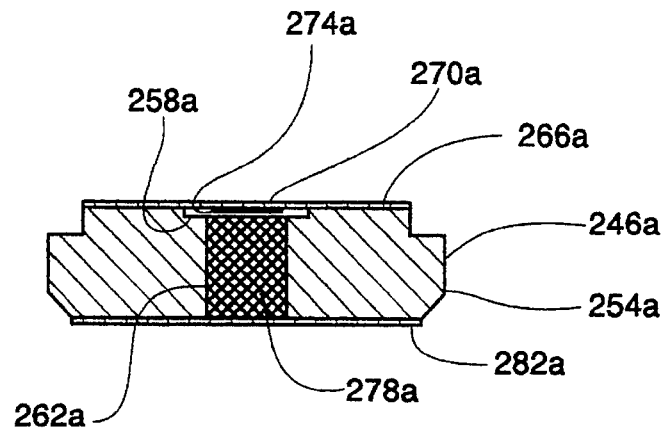
FIG. 7 is a cross-sectional view of a two-charge primer for use in an ignition assembly of a gas generator of the present invention.

The primer 246a of FIG. 7 is substantially similar to the primer 246 of FIG. 6 except for certain dimensions/exterior configuration of the primer housing 254a versus the housing 254. In this regard, in one embodiment the diameter of the first bore 258a ranges from about 0.100" to about 0.300", the length of the first bore 258a typically ranges from about 0.002" to about 0.015" (although there may be no spacing required if certain concessions/accommodations are made), the diameter of the second bore 262a ranges from about 0.050" to about 0.100", and the length of the second bore 262a ranges from about 0.050" to about 0.100". Moreover, the weight of the output charge pill 278a ranges from about 10 mg. to about 30 mg. as compared to a weight for the pill 278 of similar density which ranges from about 25 mg. to about 60 mg.

Figure 8:
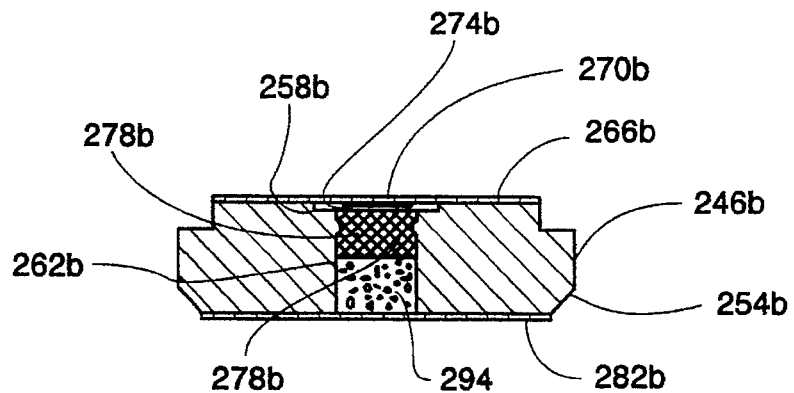
FIG. 8 is the primer housing of FIG. 7 but with an additional primer charge therein.

The primer 246b of FIG. 8 is substantially similar to the primer 246a of FIG. 7 except that the output charge pill 278b does not occupy the entire length of second bore 262b. Instead an output charge pill 278b and output charge powder 294 are used. In one embodiment, the output charge pill 278b has a length ranging from about 0.05" to about 0.125" a weight ranging from about 20 mg to about 50 mg and is positioned adjacent the base of first bore 258b. Consequently, the spacing between the end of the output charge pill 278b and the output disc 282b ranges from about 0.130" to about 0.060". This space is occupied by the powdered output charge 294 which may have the same composition of the output charge pill 278b and which may be present in an amount ranging from about 5 mg. to about 30 mg. This particular embodiment may be useful when utilizing relatively high densities for the output charge pill 278b. That is, the powdered output charge 294 may have better burn characteristics than the output charge pill 278 in some cases.

Figure 9:
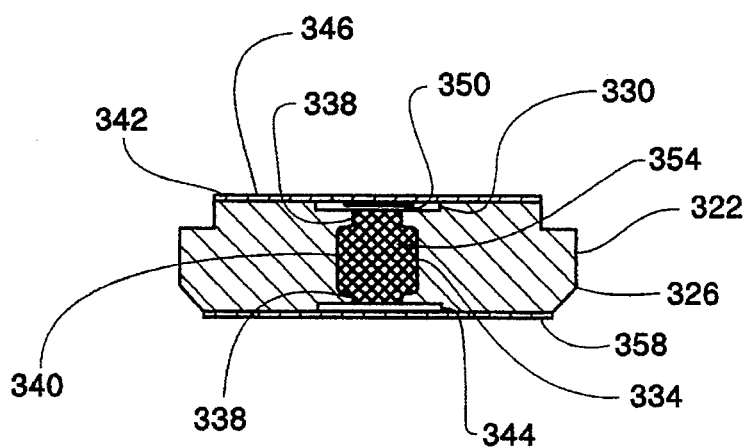
FIG. 9 is a cross-sectional view of a primer housing which has been modified to accommodate for a slurry injection for providing the output charge.

As an alternative to the three-charge configuration of the primer 246b of FIG. 8, the output charge pill to be provided to the primer housing may be formed from a water and/or alcohol slurry or paste which may be injected into the primer housing versus being pressed into a pill (e.g., packed powder) and then pressing such into the primer housing. In this regard, the primer 322 of FIG. 9 is substantially similar to the primers 246, 246a, 246b of FIGS. 6–8 except that its primer housing 326, namely the configuration of the cavities therein, is modified to better accommodate the use of a slurry injection of the output charge. In this regard, the primer housing 326 includes a first charge cavity 330 on its impact end 346 (which projects toward the firing pin) which is sealed by an input disc 342 similar to the input discs 266, 266a, 266b discussed above. Consequently, the sensitizer 350 is adhered to the interior surface of the input disc 342 and thus is positioned within the first charge cavity 330.

The primer housing 326 also includes a second charge cavity 334 which is interconnected with the first charge cavity 330 and which retains the output charge 354 which is formed from the injection of the slurry 298 in the manner discussed below. The second charge cavity 334 has necked ends 338 with a body portion 340 therebetween. The necked ends 338 each have a diameter which is less than the diameter of the body portion 340. The upper necked portion 338 interconnects the first and second charge cavities 330, 334, while the lower necked portion 338 interconnects the second charge cavity 334 with a third cavity 344 which is closed by an output disc 358 similar to the output discs 282,282a, 282b discussed above. The diameter of the third cavity 344 is greater than the diameter of the body portion 340 of the second charge cavity 334. In one embodiment, the diameter of each of the necked ends 338 may range from about 0.075" to about 0.100", the diameter of the body portion 340 may range from about 0.75" to about 0.150" and the diameter of the third cavity 344 may range from about 0.100" to about 0.250".

Figure 10A:
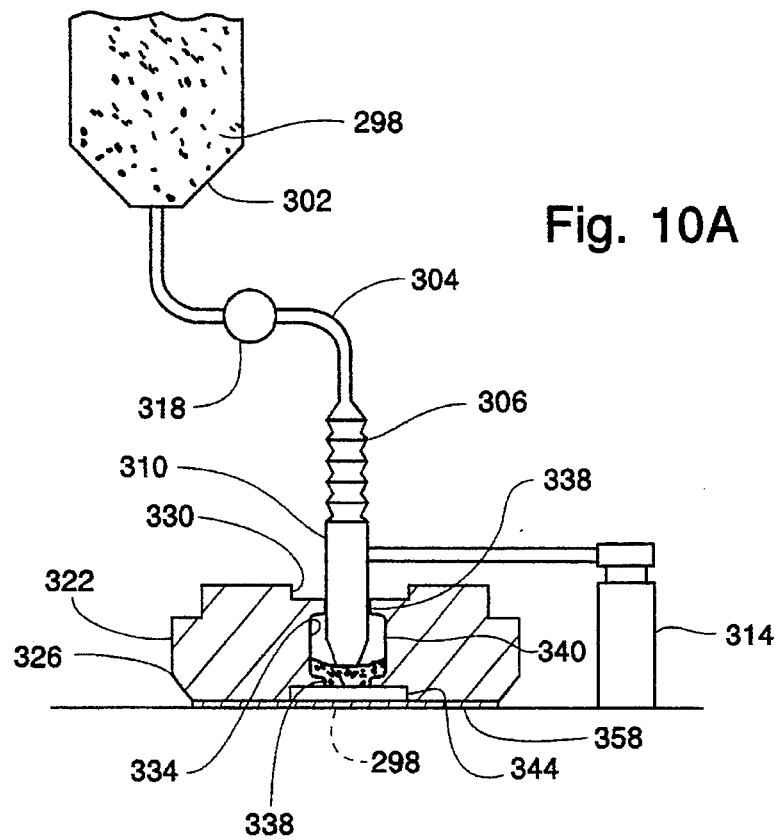
FIGS. 10A–B are schematic representations of a method for injecting an output charge slurry into the primer housing of FIG. 9.
Figure 10B:
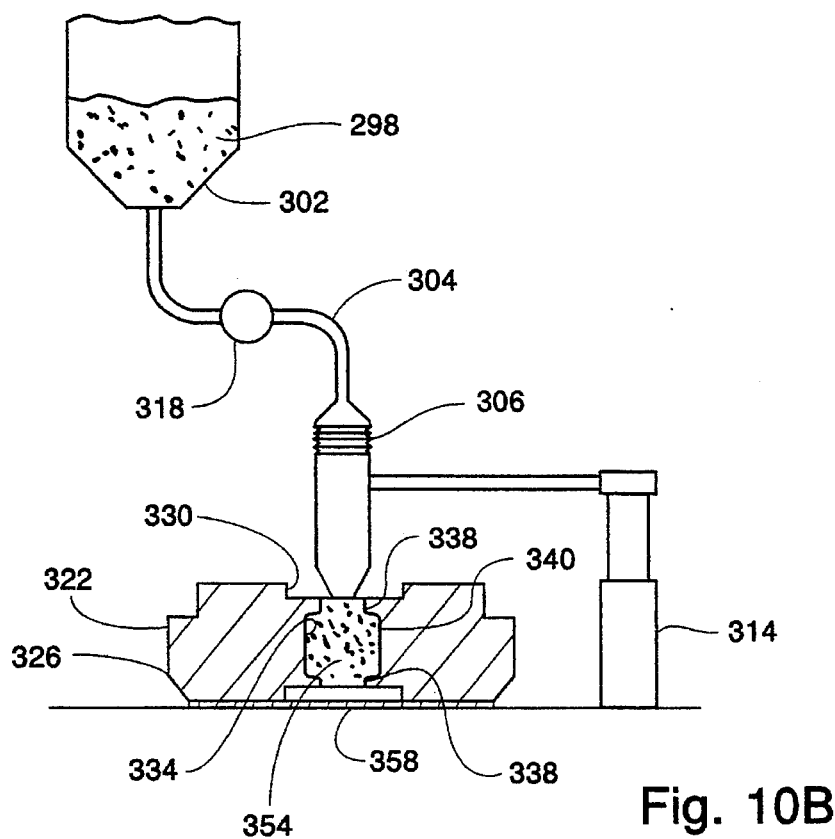

Referring to FIGS. 10A–B, a slurry 298 of an appropriate mixture for the output charge may be contained within a reservoir 302. The slurry 298 may be relatively viscous, having a viscosity ranging from about 100 poise to about 10,000 poise, thereby having a paste-like consistency. One way of producing an acceptable slurry with the aforementioned potassium ferricyanide-potassium chlorate composition is to mix the composition with 20% of its weight being an alcohol (ethanol)-water mixture (50/50), with 5% hydroxyethyl cellulose added to the water. This mixture provides an easily extrudable rheology, with very little shrinkage on drying. However, as will be discussed below, the primer 322 also accommodates for a certain amount of shrinkage.

The reservoir 302 is fluidly connected with an injector 310 by a line 304 and expandable joint 306. A hydraulic cylinder 314 is appropriately interconnected with the injector 310 to provide vertical displacement capabilities. Consequently, the primer housing 326 having the output disc 358 attached thereto is appropriately positioned beneath the injector 310. The injector 310 is then advanced downwardly within the first and second charge cavities 330, 334, and possibly the third cavity 344, and begins displacing the slurry 298 into the second charge cavity 334 and third cavity 344 via the pump 318. As the slurry 298 is injected, the injector 310 is retracted by the cylinder 314 such as to allow for the introduction of the slurry 298 without entrapping significant amounts of air. Once the slurry 298 dries, it provides an output charge 354 which remains substantially porous to provide for a desired burn rate. However, the output charge 354 is still able to ignite upon being frictionally engaged by the sensitizer 350.

As noted above, the primer 322 accommodates for a certain amount of shrinkage of the slurry 298 as it dries to form the output charge 354. More particularly, since the second charge cavity 334 includes the two necked portions 338 on each end thereof, the slurry 298 may shrink to a certain degree and yet be retained within the body portion 340 and still be engageable with the sensitizer 350 (i.e., as long as the output charge 354 does not shrink to a diameter less than that of the necked ends 338, the output charge 354 will be retained within the second charge cavity 334). Moreover, the upper necked end 338 provides a standoff which maintains a separation between the sensitizer 350 and the output charge 354 even though such may have shrunk to a degree. The bottom necked portion 338 may also be formed after the slurry 298 is injected and dried and the output disc 358 may thereafter be applied. The bottom necked portion 338 assists in maintaining the output charge 354 in position for engagement by the sensitizer 350.

In each of the above-described ignition assemblies generally comprised of a multi-charge primer and firing pin, a number of factors will contribute to the sensitivity of the particular primer to ignition (e.g., the amount of input energy required for ignition). Due primarily to the use of a sensitizer and separate output charge pill, namely the frictional engagement of such to affect ignition of a gas generating propellant, the primers may have reduced impact energy requirements which may make it useful for a variety of applications, such as in the above-discussed pretensioner 10. For instance, by reducing the input energy requirements, the complexity of the impact/deceleration sensor in a pretensioning apparatus may be reduced. A number of parameters may be adjusted to achieve a desired sensitivity.

Figure 6B:
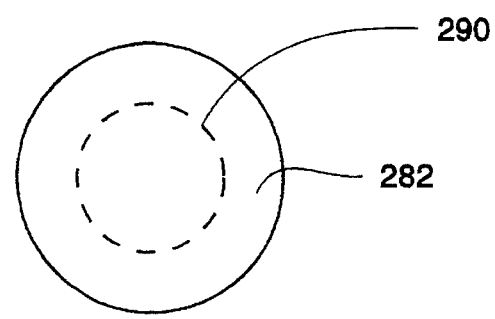
FIG. 6B is a bottom view of the output disc from the ignition assembly of FIG. 6.

Initially, the geometry and/or shape of the firing pin may affect input energy requirements. By concentrating the area of the frictional interaction between the sensitizer and output charge pill the input energy requirements may be reduced since ignition will then occur over a relatively small area. For instance and with regard to the firing pin 250 of FIGS. 6 and 6A–B discussed above, the use of a frustumly-shaped impacting end 286 serves this purpose such that input energy requirements have be reduced to about 0.5 inch-ounce and possibly below 0.25 inch-ounce.

The density of the output charge pill will also affect the sensitivity of the primers. By significantly increasing the density of the output charge pill, less input energy will be required for ignition thereof. For instance, with a density for the output charge pill which ranges from about 90% of theoretical to about 97% of theoretical, the input energy requirements may be reduced to about 1 in-oz. However, as noted above, increasing the density of the output charge above certain levels may necessitate the use of a powdered output charge to affect ignition of the gas generating propellant.

The material selection and/or thickness of the impact end of the primer will also affect the sensitivity of the primer. By using stiffer materials and/or increasing the thickness of the impact end, input energy requirements will be increased. Conversely, utilizing more flexible/pliable/deformable materials and/or decreasing the thickness of the impact end may reduce input energy requirements. In addition, the spacing between the output charge pill and sensitizer may affect primer sensitivity. For instance, increasing the spacing will decrease sensitivity, whereas reducing the spacing will increase sensitivity.

The diameter of the bore which contains the sensitizer may also affect input energy requirements. For instance, in the event that a relatively large diameter bore is utilized, it will be easier to deflect the sensitizer into engagement with the output charge pill to affect ignition. Conversely, decreasing the diameter of the bore will make it more difficult to create the necessary deflection without piercing the input disc, and thereby serves to increase input energy requirements.

As previously noted, each of the above-described ignition assemblies and/or primers may be incorporated into the pretensioner 10 of FIG. 1 and/or the inflator 78 of FIG. 3. That is, each of the various primers described herein may replace the primers 50 and 118 which were only generally illustrated in the pretensioner 10 and 78, respectively, while the various firing pins described herein may replace the firing pin 54 of the pretensioner 10 as well as the firing pin assembly 114 of the inflator 78. Moreover, various other combinations of primers and firing pins may be used in addition to those disclosed herein. That is, the present invention is not limited to the specific combinations presented herein.

The foregoing description of the present invention has been presented for purposes of illustration and description. Furthermore, the description is not intended to limit the present invention to the form disclosed herein. Consequently, variations and modifications of the present invention which are commensurate with the above teachings to those having skill or knowledge of the relevant art, are also within the scope of the present invention. The embodiments described hereinabove are further intended to explain best modes known of practicing the invention to enable others skilled in the art to utilize the invention in such or other embodiments and with the various modifications required by their particular applications or uses of the present invention. It is intended that the appended claims be construed to include alternative embodiments to the extent permitted by the prior art.

What is claimed is:

1. A gas generator, comprising:

a gas generator housing comprising at least one gas generator outlet and containing a gas generating propellant;

a primer comprising a primer housing and first and second charges within said primer housing, wherein said primer housing is interconnected with said gas generator housing, wherein said first and second charges are spaced from each other within said primer housing, and wherein said second charge comprises a first surface which projects toward said first charge and has a first surface area, said primer housing further comprising first and second interconnected and aligned bores which collectively extend through said primer housing and input and output discs which close an end of said first and second bores, respectively, said first charge being positioned on an interior surface of said input disc and said second charge being positioned within at least a portion of said second bore;

a firing pin aligned with said primer, said input disc projecting toward said firing pin and said output disc projecting toward said propellant, wherein said firing pin engages said primer to frictionally engage said first and second charges to ignite at least said second charge, said propellant being ignited by said ignition of at least said second charge to generate propellant gases which flow out of said at least one gas generator outlet;

said firing pin concentrating an engaging force between said first and second charges over a region of said first surface of said second charge which is substantially less than said first surface area, wherein a ratio of an area of said region to said first surface area is within the range from about 0.07% to about 2.56%; and an automotive safety device responsive to said propellant gases.

2. A gas generator, as claimed in claim 1, wherein:

said input disc comprises a substantially flexible and pliable material which is deflected by said firing pin.

3. A gas generator, as claimed in claim 4, wherein:

said input disc comprises a metal-containing substance which is deformed by said firing pin.

4. A gas generator, as claimed in claim 4, wherein:

said output disc comprises at least one score line, wherein ignition of said second charge ruptures said output disc along at least said score line.

5. A gas generator, as claimed in claim 4, wherein:

said first and second bores are substantially cylindrical, directly interconnected, substantially concentrically positioned about a central axis of said primer housing, and have first and second diameters, respectively.

6. A gas generator, as claimed in claim 5, wherein:

said first diameter is greater than said second diameter.

7. A gas generator, as claimed in claim 1, wherein:

a composition of said first charge is selected from the group consisting essentially of sulfur, red phosphorous and mixtures thereof.

8. A gas generator, as claimed in claim 1, wherein:

a composition of said second charge comprises potassium chlorate and potassium ferricyanide.

9. A gas generator, as claimed in claim 1, wherein:

said second charge has a density ranging from about 90% of theoretical to about 97% of theoretical.

10. A gas generator, as claimed in claim 1, wherein:

said second charge comprises a compressed solid pill.

11. A gas generator, as claimed in claim 1, wherein: said firing pin is frustumly-shaped to define a substantially circular impacting end having a diameter ranging from about 0.002" to about 0.020".

12. A gas generator, comprising:

a gas generator housing comprising at least one gas generator outlet and containing a gas generating propellant;

a primer comprising a primer housing and first and second charges within said primer housing, wherein said primer housing is interconnected with said gas generator housing and wherein said first and second charges are spaced from each other within said primer housing; and a firing pin aligned with said primer, wherein said firing pin engages said primer to frictionally engage said first and second charges to ignite at least said second charge, said propellant being ignited by said ignition of said second charge to generate propellant gases which flow out of said at least one gas generator outlet, wherein said primer housing further comprises first and second interconnected and aligned bores which collectively extend through said primer housing and input and output discs which close an end of said first and second bores, respectively, said first charge being positioned on an interior surface of said input disc and said second charge being positioned within at least a portion of said second bore, said input disc projecting toward said firing pin and said output disc projecting toward said propellant, wherein said first bore has a first diameter and said second bore has a second diameter less than said first diameter; and an automotive safety device responsive to said propellant gases.

13. A gas generator, as claimed in claim 12, wherein:

said input disc comprises a substantially flexible and pliable material which is deflected by said firing pin.

14. A gas generator, as claimed in claim 12, wherein:

said input disc comprises a metal-containing substance which is deformed by said firing pin.

15. A gas generator, as claimed in claim 12, wherein:

said output disc comprises at least one score line, wherein ignition of said second charge ruptures said output disc along at least said score line.

16. A gas generator, as claimed in claim 12, wherein:

said first and second bores are substantially cylindrical, directly interconnected, and substantially concentrically positioned about a central axis of said primer housing.

17. A gas generator, as claimed in claim 12, wherein:

a composition of said first charge is selected from the group consisting essentially of sulfur, red phosphorous and mixtures thereof.

18. A gas generator, as claimed in claim 12, wherein:

a composition of said second charge comprises potassium chlorate and potassium ferricyanide.

19. A gas generator, as claimed in claim 12, wherein:

said second charge has a density ranging from about 90% of theoretical to about 97% of theoretical.

20. A gas generator, as claimed in claim 12, wherein:

said second charge comprises a compressed solid pill.

21. A gas generator, as claimed in claim 12, further comprising:

a third charge positioned within said primer housing, said third charge being positioned between said second charge and said gas generating propellant, wherein ignition of said second charge ignites said third charge and wherein ignition of said third charge ignites said gas generating propellant.

22. A gas generator, as claimed in claim 21, wherein:

said second charge comprises a solid pill and said third charge comprises a powder.

* * * * *